(12) United States Patent
Heid

(10) Patent No.: US 8,760,086 B2
(45) Date of Patent: Jun. 24, 2014

(54) ACCELERATOR FOR TWO PARTICLE BEAMS FOR PRODUCING A COLLISION

(75) Inventor: Oliver Heid, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/703,065

(22) PCT Filed: Apr. 5, 2011

(86) PCT No.: PCT/EP2011/055235
§ 371 (c)(1),
(2), (4) Date: Jan. 24, 2013

(87) PCT Pub. No.: WO2011/154172
PCT Pub. Date: Dec. 15, 2011

(65) Prior Publication Data
US 2013/0127376 A1   May 23, 2013

(30) Foreign Application Priority Data
Jun. 10, 2010 (DE) .......................... 10 2010 023 339

(51) Int. Cl.
*H05H 7/00* (2006.01)

(52) U.S. Cl.
USPC ........... 315/506; 315/500; 315/501; 315/502; 315/503; 315/504; 315/505

(58) Field of Classification Search
USPC .................................. 315/506–500, 500–506
See application file for complete search history.

(56) References Cited

U.S. PATENT DOCUMENTS 3,386,883 A * 6/1968 Farnsworth .................... 376/107
(Continued)

FOREIGN PATENT DOCUMENTS

| DE | 102009023305 A1 | 12/2010 | ............... A61N 5/10 |
| EP | 0441261 A2 | 8/1991 | ............... H05H 1/03 |

(Continued)

OTHER PUBLICATIONS

Alessandro G Ruggiero, "Nuclear Fusion of Protons with Boron" BNL 47989, Sep. 4, 1992 p. 1-19.*

(Continued)

*Primary Examiner* — Douglas W Owens
*Assistant Examiner* — Srinivas Sathiraju
(74) *Attorney, Agent, or Firm* — King & Spalding L.L.P.

(57) ABSTRACT

An accelerator for accelerating two beams of charged particles and for producing a collision of the beams includes: an apparatus for producing an electrostatic potential field such that the two beams are acceleratable or deceleratable by the electrostatic field, a reaction zone for collision of the charged particles; first and second acceleration distances for the first and second beams, each acceleration distance directed towards the reaction zone, wherein the reaction zone is arranged geometrically with respect to the potential field and to the acceleration distances such that the particles of the beams are acceleratable towards the reaction zone along the first and second acceleration distances and, after interaction in the reaction zone and passage through the reaction zone, are deceleratable in the potential field, such that energy used by the potential field apparatus for accelerating the beams towards the reaction zone can be at least partially recovered by the deceleration.

12 Claims, 7 Drawing Sheets

(56) References Cited

U.S. PATENT DOCUMENTS

| | | | |
|---|---|---|---|
| 3,530,497 A * | 9/1970 | Hirsch et al. | 376/107 |
| 4,826,646 A | 5/1989 | Bussard | 376/129 |
| 5,160,695 A | 11/1992 | Bussard | 376/107 |
| 5,162,094 A | 11/1992 | Curtis | 376/107 |
| 7,626,180 B2 * | 12/2009 | Osada et al. | 250/423 R |
| 8,080,490 B2 | 12/2011 | Fechner et al. | 501/24 |
| 8,324,810 B2 * | 12/2012 | Kazakov et al. | 315/39.51 |
| 2003/0002611 A1 | 1/2003 | Greatbatch | 376/147 |
| 2012/0068632 A1 * | 3/2012 | Heid | 315/500 |
| 2012/0313554 A1 * | 12/2012 | Heid | 315/503 |
| 2012/0313556 A1 * | 12/2012 | Heid | 315/506 |
| 2013/0127376 A1 | 5/2013 | Heid | 315/506 |

FOREIGN PATENT DOCUMENTS

| | | | |
|---|---|---|---|
| JP | 49027915 | 3/1974 | B32B 27/28 |
| JP | 2005189224 A | 7/2005 | G21B 1/00 |
| JP | 4602320 B2 | 12/2010 | A01N 59/00 |
| WO | 2011/154172 A1 | 12/2011 | G12B 1/15 |

OTHER PUBLICATIONS

P Beasley et al A New Life for High Voltage Electrostatic accelerators, Proceedings of IPAC May 23-28, 2010, MOPD018.*

Ruggiero, Alessandro, "Nuclear Fusion of Protons with Born," Brookhaven National Laboratory, Accelerator Physics Technical Note, 20 pages, Sep. 4, 1992.

Descoeudres, A. et al., "DC Breakdown Experiments for CLIC," Proceedings of European Particle Accelerator Conference 2008, Genoa, Italy, 4 pages, Jul. 2008.

Beasley, P. et al., "A New Life for High Voltage Electrostatic Accelerators," Proceedings of IPAC 2010, Kyoto, Japan, MOPD018, 4 pages, May 2010.

Macleod, Christopher et al., "A Reconsideration of Electrostatically Accelerated and Confined Nuclear Fusion for Space Applications," Journal of British Interplanetary Society, vol. 63, No. 5/6, 15 pages, Dec. 6, 2010.

International Search Report and Written Opinion, Application No. PCT/EP2011/055235, 17 pages, Sep. 14, 2011.

* cited by examiner

ACCELERATOR FOR TWO PARTICLE BEAMS FOR PRODUCING A COLLISION

CROSS-REFERENCE TO RELATED APPLICATIONS

This application is a U.S. National Stage Application of International Application No. PCT/EP2011/055235 filed Apr. 5, 2011, which designates the United States of America, and claims priority to DE Patent Application No. 10 2010 023 339.0 filed Jun. 10, 2010 The contents of which are hereby incorporated by reference in their entirety.

TECHNICAL FIELD

This disclosure relates to an accelerator for triggering atomic reactions.

BACKGROUND

There are atomic reaction devices, in which beams of accelerated particles are directed on one another to trigger a collision.

Thus, e.g., it is known that the reaction partners of a proton-$^{11}$boron atomic fusion reaction are to have a kinetic energy of greater than 600 keV relative to one another. In the case of fusion, 8.7 MeV of energy is released.

SUMMARY

In one embodiment, an accelerator for accelerating two beams of charged particles and for producing a collision between the two beams may include: a potential field device for generating an electrostatic potential field, which is composed such that the two beams of the charged particles can be accelerated or decelerated, respectively, by the electrostatic field; a reaction zone, in which the collision of the two beams occurs; a first acceleration distance for the first beam in the potential field, which first acceleration distance is directed toward the reaction zone; and a second acceleration distance for the second beam in the potential field, which second acceleration distance is directed toward the reaction zone; wherein the reaction zone is geometrically arranged in relation to the potential field and the first and second acceleration distances such that the particles of the two beams can be accelerated toward the reaction zone along the first acceleration distance and the second acceleration distance, and after interacting in the reaction zone and passing through the reaction zone can be decelerated again in the potential field, so that the energy applied by the potential field device to accelerate the two beams toward the reaction zone can be at least partially reclaimed by the deceleration.

In a further embodiment, the accelerator includes: a first deceleration distance for the first beam in the potential field, which first deceleration distance is directed away from the reaction zone, and/or a second deceleration distance for the second beam in the potential field, which second deceleration distance is directed away from the reaction zone.

In a further embodiment, the accelerator includes: a first source for providing charged particles for the first beam and for feeding them into the first acceleration distance and/or a second source for providing charged particles for the second beam and for feeding them into the second acceleration distance.

In a further embodiment, the accelerator includes: a first catcher for the decelerated particles of the first beam, which is located at the end of the first beam distance and is in particular negatively charged, and/or a second catcher for the decelerated particles of the second beam, which is located at the end of the second beam distance and is in particular negatively charged.

In a further embodiment, the first particles are protons and/or the second particles are boron ions and the potential field is designed in particular such that a collision energy of greater than 600 keV is achievable.

In a further embodiment, the potential field device comprises a capacitor stack made of electrodes arranged concentrically to one another, having a first electrode, which can be brought to a first potential, having a second electrode, which is arranged concentrically to the first electrode and can be brought to a second potential, which is different from the first potential, so that an accelerating potential forms between the first electrode and the second electrode, wherein the reaction zone is located in the interior of the first electrode.

In a further embodiment, the potential field device comprises one or more intermediate electrodes, which are arranged concentrically between the first electrode and the second electrode; and wherein a switching device is provided, to which the electrodes of the capacitor stack are connected and which is designed such that during operation of the switching device, the electrodes of the capacitor stack, which are arranged concentrically to one another, can be brought to increasing potential steps according to the sequence of their arrangement.

BRIEF DESCRIPTION OF THE DRAWINGS

Example embodiments will be explained in more detail below with reference to figures, in which.

DETAILED DESCRIPTION

Figure 1:
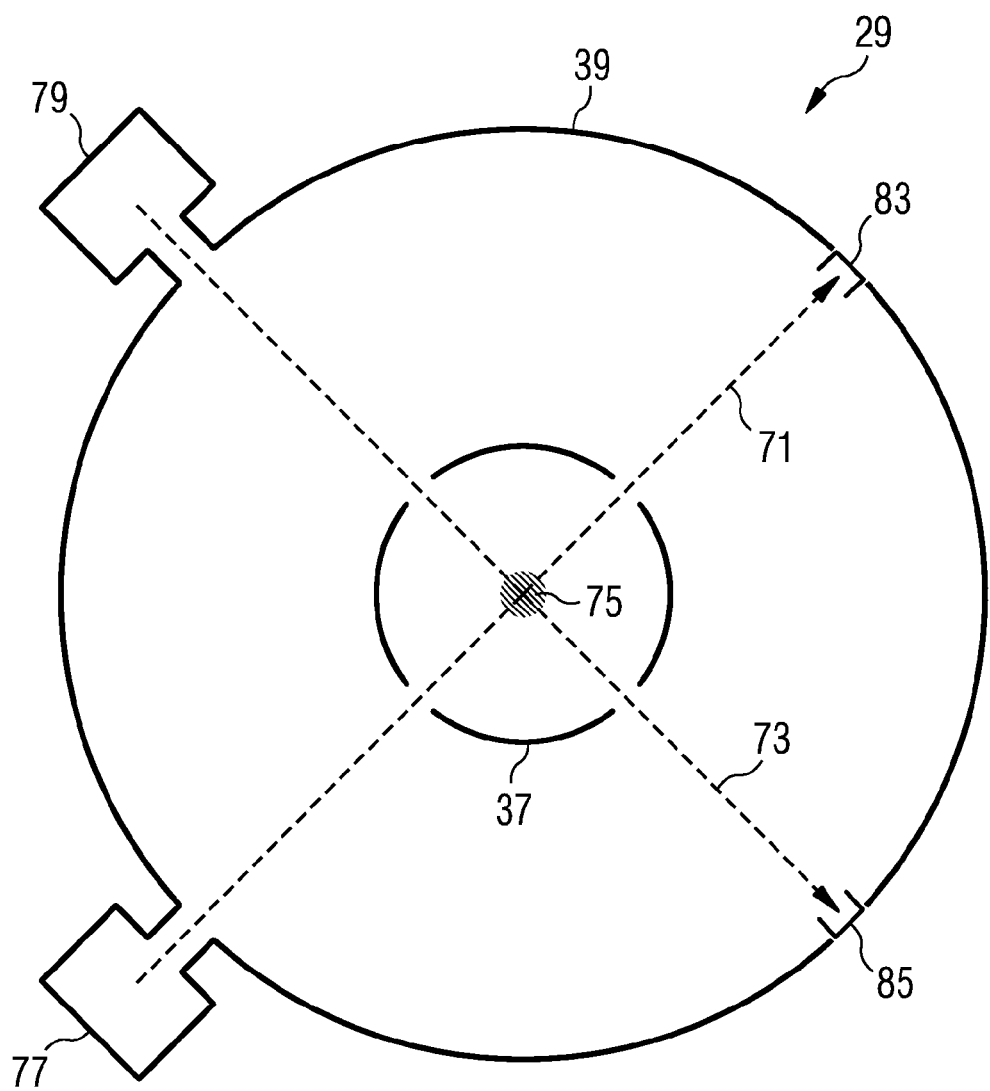
FIG. 1 shows a schematic illustration of the structure of the accelerator.

Embodiments of the present disclosure provide an accelerator having an energy-efficient arrangement for triggering atomic reactions.

For example, an accelerator accelerating two beams of charged particles and for producing a collision between the two beams may include:
  a potential field device for generating an electrostatic potential field, which is composed such that the two beams of the charged particles can be accelerated or decelerated, respectively, by the electrostatic field,
  a reaction zone, in which the collision of the two charged particle beams occurs, a first acceleration distance for the first beam in the potential field, which first acceleration section is directed toward the reaction zone, a second acceleration distance for the second beam in the potential field, which acceleration distance is also directed toward the reaction zone.

The reaction zone is geometrically arranged in relation to the potential field and to the first and second acceleration distances such that the particles of the two beams are accelerated, during operation of the accelerator, toward the reaction zone along the first acceleration distance and the second acceleration distance. After interaction in the reaction zone and passage through the reaction zone in the potential field, the particles which do not collide with one another are decelerated again, so that the energy applied by the potential field device for accelerating the two beams toward the reaction zone can be at least partially reclaimed by the deceleration.

The proposed arrangement therefore uses an electrostatic acceleration field to accelerate at least two ion beams as the reaction partners. After acceleration and passage of the reactant beams through the interaction zone, the charged particles are decelerated in the electrostatic field back to a low velocity. In this manner, the kinetic energy of the particles which have not reacted with one another is substantially and in large parts reclaimed again.

In this manner, a smaller reaction cross section can also be tolerated. Specifically, it has been recognized that in arrangements which destroy the beam after passage through the reaction zone, e.g., through a so-called beam dump, a greater energy loss can occur. E.g., in the event of an excessively small reaction cross section of the reactants for atomic fusion reactions, this can have the result that the energy yield is negative overall, in spite of high energy yield in the actual fusion reaction.

This negative net energy yield can also have a negative effect upon the use of a solid target, since the kinetic energy is also not reclaimed in this case.

The proposed arrangement solves the problems, since a majority of the energy applied for the acceleration of the particles is reclaimed again by the geometric arrangement of the electrostatic potential field, the beam extensions, and the reaction zone to one another.

Since a part of the particles pass through the reaction zone without substantial influence, through the geometric arrangement in the potential field, 60%, in particular 70%, or at most in particular 80% or even 90% of the applied energy for the acceleration of the particle beams can be reclaimed again.

It is therefore possible at a given energy expenditure to apply strong particle beams and therefore achieve a high reaction rate. In contrast to a plasma reactor, the presence of electrons in the reaction zone is additionally minimized, so that, e.g., losses by radiation and momentum transfer are minimized.

In addition, the accelerator can have a first deceleration distance for the first beam in the potential field, which first deceleration distance is directed away from the reaction zone. The accelerator can also have a second deceleration distance in the potential field for the second beam, which second deceleration distance is directed away from the reaction zone. The accelerator therefore does not have to have a deceleration distance for each beam. It can already be sufficient for the partial energy reclamation, for example, to decelerate one of the two beams after passage through the reaction zone.

The accelerator can additionally comprise a first source for providing charged particles for the first beam and for feeding them into the first acceleration distance. The accelerator can also have a second source for providing charged particles for the second beam and for feeding them into the second acceleration distance.

The accelerator can additionally comprise a first catcher for the decelerated particles of the first beam, which is located at the end of the first beam distance and is in particular negatively charged. The accelerator can also comprise a second catcher for the decelerated particles of the second beam, which is located at the end of the second beam distance and is in particular negatively charged. The catcher electrodes collect the decelerated particles. The potential at which the catcher electrodes lie is selected such that the catcher electrodes will capture the decelerated particles. The potential of the catcher electrodes is typically adapted to the location in the potential field, at which the catcher electrodes are arranged.

The particles of the first beam can be protons. The particles of the second beam can be boron ions. The potential field device can be designed in particular such that a collision energy of greater than 600 keV can be achieved by the generated potential field. In this manner, the accelerator can be used for the proton-$^{11}$boron fusion reaction.

The potential field device can comprise a capacitor stack made of electrodes arranged concentrically to one another, having a first electrode which can be brought to a first potential and having a second electrode which is arranged concentrically around the first electrode and which can be brought to a second potential different from the first potential, so that an accelerating potential forms between the first electrode and the second electrode, wherein the reaction zone is located in the interior of the first electrode. The first electrode can therefore be a negatively charged high-voltage electrode.

The potential field device can comprise one or more intermediate electrodes, which are arranged concentrically between the first electrode and the second electrode. A switching device can be provided, to which the electrodes of the capacitor stack are connected and which is designed such that during operation of the switching device, the electrodes of the capacitor stack, which are arranged concentrically to one another, can be brought to increasing potential steps according to the sequence of their arrangement. The high-voltage electrode can be the innermost electrode in the concentric arrangement, while the outermost electrode can be, e.g., a ground electrode.

Through the switching device having electron tubes, the electrodes of the capacitor stack can be charged with a pump AC voltage. The amplitude of the pump AC voltage can be comparatively small in relation to the achievable DC high voltage. This structure of the potential field device allows a higher acceleration to be provided with a compact structure.

The concentric arrangement allows a compact construction overall. For favorable utilization of the insulation volume, i.e., the volume between the inner electrode and the outer electrode, one or more concentric intermediate electrodes are brought to suitable potentials. The potential steps are successively increasing and can be selected such that a substantially uniform field strength results in the interior of the entire insulation volume.

High vacuum can be located in the insulation volume. Use of insulating materials has the disadvantage that the materials, upon strain by an electric DC field, tend toward accumulation of internal charges—which are induced in particular by ionizing radiation during operation of the accelerator. The accumulated traveling charges induce a strongly inhomogeneous electrical field strength in all physical insulators, which then results in local exceeding of the breakdown limit and thus the formation of spark channels. Insulation of the electrodes of the electrode stack by high vacuum to one another avoids such disadvantages. The electrical field strength usable in stable operation may thus be increased. The arrangement is therefore substantially—except for a few components, e.g., the suspension of the electrodes—free of insulator materials. Efficient, i.e., space-saving and robust insulation of the high-voltage electrode is thus made possible.

The introduced intermediate electrodes additionally increase the breakdown field strength limit, so that higher DC voltages can be generated than without intermediate electrodes. This is because the breakdown field strength in vacuum is approximately inversely proportional to the square root of the electrode spacings. The introduced intermediate electrode(s), using which the electrical field is made more uniform in the interior of the DC voltage high-voltage source, simultaneously contribute to an advantageous increase of the possible achievable field strength.

If such a DC voltage high-voltage source is used as the potential field device, a particle energy in the MV range can be achieved with a compact construction.

In one embodiment, the switching device comprises a high-voltage cascade, in particular a Greinacher cascade or a Cockcroft-Walton cascade. Using such a device, the first electrode, the second electrode, and the intermediate electrodes can be charged to generate the DC voltage with the aid of a comparatively low AC voltage.

This embodiment is based on the idea of high-voltage generation, as is made possible, for example, by a Greinacher rectifier cascade. Employed in an accelerator, the electrical potential energy is used for the purpose of converting kinetic energy of the particles, in that the high potential is applied between the particle source and the end of the acceleration distance.

In one embodiment variant, the capacitor stack is divided by a gap, which extends through the electrodes, into two capacitor chains separated from one another. Through a separation of the concentric electrodes of the capacitor stack into two capacitor chains separated from one another, the two capacitor chains can advantageously be used for the formation of a cascaded switching device such as a Greinacher or Cockcroft-Walton cascade. Each capacitor chain represents an arrangement of (partial) electrodes, which are in turn arranged concentrically to one another.

If the electrode stack is designed as a spherical shell stack, the separation can be performed, e.g., by a cut along the equator, which then results in two hemispherical stacks.

The individual capacitors of the chains can be charged in such a circuit respectively to the peak-peak voltage of the primary input AC voltage, which is used to charge the high-voltage source, so that above-mentioned potential equilibration, uniform electrical field distribution, and therefore optimum utilization of the insulation distance are achieved in a simple manner.

In an advantageous manner, the switching device, which comprises a high-voltage cascade, can connect the two capacitor chains, which are separated from one another, to one another and in particular can be arranged in the gap. The input AC voltage for the high-voltage cascade can be applied between the two outermost electrodes of the capacitor chains, since these can be externally accessible, for example. The diode chains of a rectifier circuit may then be attached in the equatorial gap—and thus in a space-saving manner.

The electrodes of the capacitor stack can be shaped such that they lie on an ellipsoid surface, in particular a spherical surface, or on a cylinder surface. These shapes are physically favorable. The selection of the shape of the electrodes as in the case of a hollow sphere or a spherical capacitor is particularly favorable. Similar shapes, e.g., as in the case of a cylinder, are also possible, wherein the latter typically has a comparatively inhomogeneous electrical field distribution, however.

The low inductance of the shell-type potential electrodes allows the application of high operating frequencies, so that the voltage reduction upon current drain remains limited in spite of relatively low capacitance of the individual capacitors.

In one embodiment, the switching device comprises diodes, which can be designed in particular as electron tubes. This is advantageous in comparison to semiconductor diodes, since now there is no physical connection between the electrode stacks, which is accompanied by a breakdown danger, and since vacuum diodes have a current limiting effect and are robust in relation to a current overload or a voltage overload.

The diodes of the rectifier chain can even be designed as vacuum electron tubes without a separate vacuum vessel. In this case, the vacuum required for the operation of the electron tubes is formed by the vacuum of the vacuum insulation.

The cathodes can be designed as thermal electron emitters, e.g., with radiant heating through the equatorial gap or as photocathodes. The latter allow, through modulation of the exposure, e.g., by laser radiation, a control of the current in each diode and therefore of the charging current and thus indirectly the high voltage.

The acceleration distance(s) or the deceleration distance(s) can be formed by openings in the electrodes of the capacitor stack. The acceleration or deceleration of the particles is then performed by the electrodes.

In an accelerator, the use of vacuum additionally has the advantage that no separate beam tube must be provided, which in turn at least partially has an insulator surface. This also avoids critical problems of the wall discharge from occurring along the insulator surfaces, since the acceleration channel now does not have any insulator surfaces.

FIG. 1 shows a schematic illustration of the accelerator 29 according to an example embodiment for accelerating two beams 71, 73 of charged particles and for producing a collision between the two beams. The principle of the functionality can be explained on the basis of this illustration.

The accelerator 29 has a device which generates a static potential field. In the exemplary embodiment shown here, the device comprises a negatively charged first, central electrode 37, which can be cylindrical or spherical, for example. The central electrode 37 comprises openings, through which the accelerated particle beams 71, 73 can enter or exit again, respectively. An outer electrode 39 can be at ground and comprises corresponding openings to the central electrode 37.

The static potential field, which is used to accelerate or decelerate the particle beams 71, 73, is formed between the central electrode 37 and the outer electrode 39.

The interaction zone 75, in which the two particle beams 71, interact with one another, is located in the interior of the central electrode 37.

A first ion source 77 is located outside the outer electrode 39 and provides a first ion type, for example, protons —$H^+$. A second ion source 79 is also located outside the outer electrode 39 and provides a second ion type, for example, $^{11}B^{5+}$ ions.

The ions are shaped into a first particle beam 71 or a second particle beam 73, respectively, and accelerated by the potential field which is generated by the device. After the two particle beams 71, 73 pass through the interaction zone 75, the two particle beams 71, 73 are decelerated again, so that a large part of the energy applied for the acceleration can be reclaimed again. At the end of the deceleration distance, a catcher electrode 83, 85 is respectively located for capturing the decelerated particles. The catcher electrodes 83, 85 are at a low negative potential, so that their function is ensured.

Figure 2:
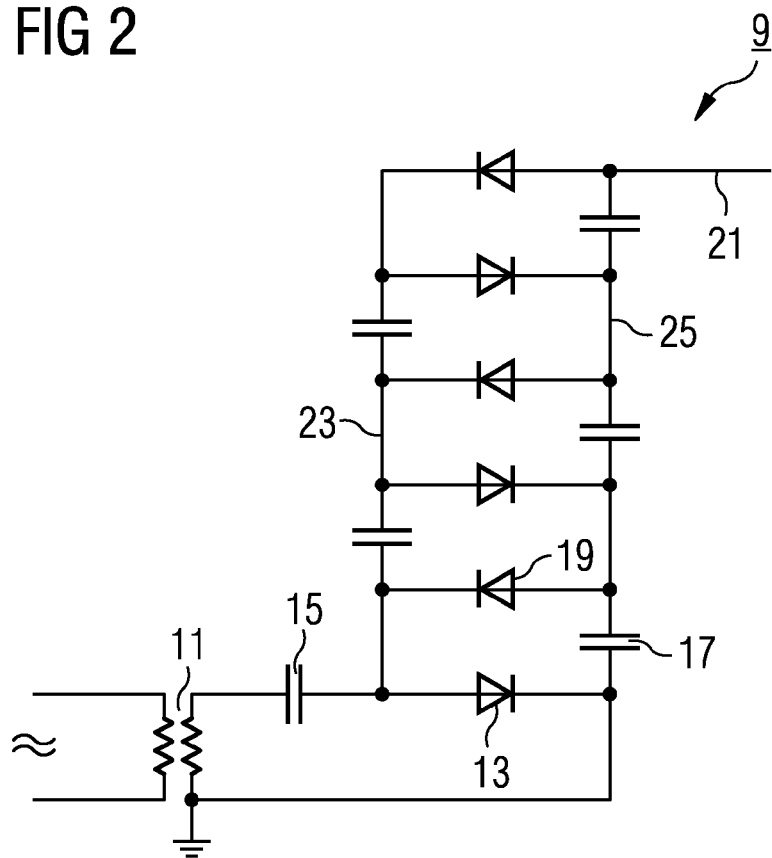
FIG. 2 shows a schematic illustration of a known Greinacher circuit.

The principle of a high-voltage cascade 9, which is constructed according to a Greinacher circuit, is to be explained on the basis of the circuit diagram in FIG. 2. Using this principle, a structure of the potential field device may be achieved which is particularly advantageous and is explained hereafter on the basis of FIG. 3.

An AC voltage U is applied at an input 11. The first half wave charges the capacitor 15 to the voltage U via the diode 13. In the following half wave of the AC voltage, the voltage U from the capacitor 13 is added together with the voltage U at the input 11, so that the capacitor 17 is now charged via the diode 19 to the voltage 2U. This process is repeated in the following diodes and capacitors, so that in the circuit shown in FIG. 1, the voltage 6U is achieved overall at the output 21. FIG. 2 thus clearly shows how respectively the first set 23 of capacitors forms a first capacitor chain and the second set 25 of capacitors forms a second capacitor chain through the illustrated circuit.

Figure 3:
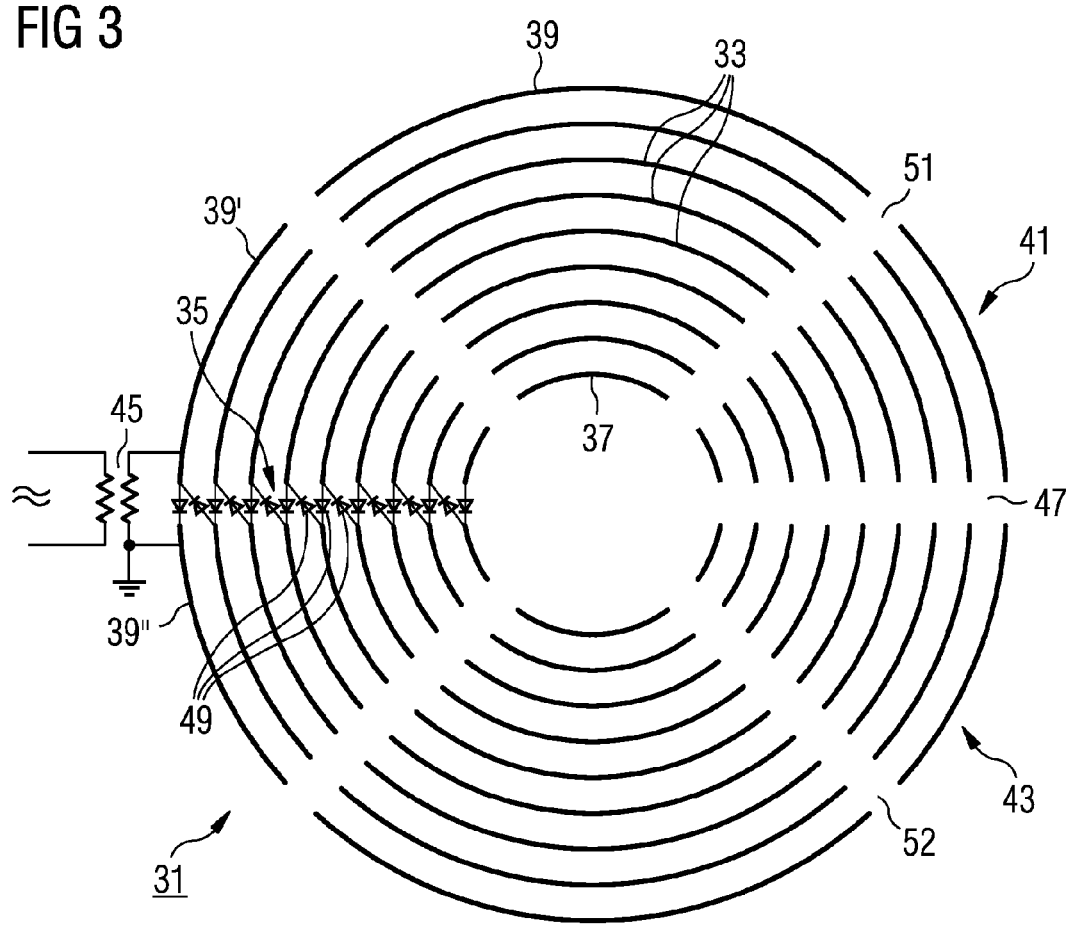
FIG. 3 shows a schematic illustration of a section through a potential field device having a reaction zone in the center.

FIG. 3 shows a schematic section through a high-voltage source 31 having a central electrode 37, an outer electrode 39, and a series of intermediate electrodes 33, which are interconnected by a high-voltage cascade 35, whose principle was explained in FIG. 2, and can be charged by this high-voltage cascade 35. The high-voltage source is used as the device for generating the potential field. The sources and the catcher electrodes are not shown in FIG. 3 for the sake of clarity, but are located in a similar point as in FIG. 1.

The electrodes 39, 37, 33 are designed in the form of hollow spheres and are arranged concentrically to one another. The maximum electrical field strength which can be applied is proportional to the curvature of the electrodes. A spherical shell geometry is therefore particularly favorable.

The high-voltage electrode 37 is located in the center, the outermost electrode 39 can be a ground electrode. The electrodes 37, 39, 33 are divided into two hemispherical stacks, which are separated from one another by a gap, by an equatorial cut 47. The first hemispherical stack forms a first capacitor chain 41, the second hemispherical stack forms a second capacitor chain 43.

The voltage U of an AC voltage source 45 is respectively applied to the outermost electrode shell halves 39', 39". The diodes 49 to form the circuit are arranged in the region of the great circle of the hollow hemispheres, i.e., in the equatorial cut 47 of the respective hollow spheres. The diodes 49 form the transverse connections between the two capacitor chains 41, 43, which correspond to the two sets 23, 25 of capacitors from FIG. 2.

In the high-voltage source 31 shown here, a first acceleration or deceleration distance 51 and a second acceleration or deceleration distance 52, respectively, are formed through openings in the electrode shells.

In order to insulate the high-voltage electrode 37, the entire electrode arrangement is insulated by a vacuum insulation. Inter alia, particularly high voltages of the high-voltage electrode 37 can thus be generated, which result in particularly high particle energy. However, an installation of the high-voltage electrode using solid or liquid insulation is also conceivable in principle.

The use of vacuum as an insulator and the use of an intermediate electrode spacing in the magnitude of 1 cm allows electrical field strengths of values of greater than 20 MV/m to be achieved. In addition, the use of vacuum has the advantage that the accelerator does not have to be underloaded during operation, since the radiation occurring during the acceleration can result in problems in the case of insulator materials. This allows the construction of smaller and more compact machines.

One embodiment of the high-voltage source provides setting the central electrode to a potential of −10 MV.

The high-voltage source can have N=50 steps, i.e., a total of 100 diodes and capacitors. At an internal radius of r=0.05 m and a vacuum insulation having a breakdown field strength of 20 MV/m, the outer radius is 0.55 m. 50 intermediate spaces having a spacing of 1 cm between adjacent spherical shells are located in each hemisphere.

A smaller number of steps reduces the number of the charge cycles and the effective internal source impedance, but increases the demands on the pump charge voltage.

The diodes arranged in the equatorial gap, which connect the two hemisphere stacks to one another, can be arranged in a spiral-type pattern, for example. The total capacitance can be 74 pF according to equation (3.4), and the stored energy can be 3.7 kJ. A charging current of 2 mA requires an operating frequency of approximately 100 kHz.

Figure 4:
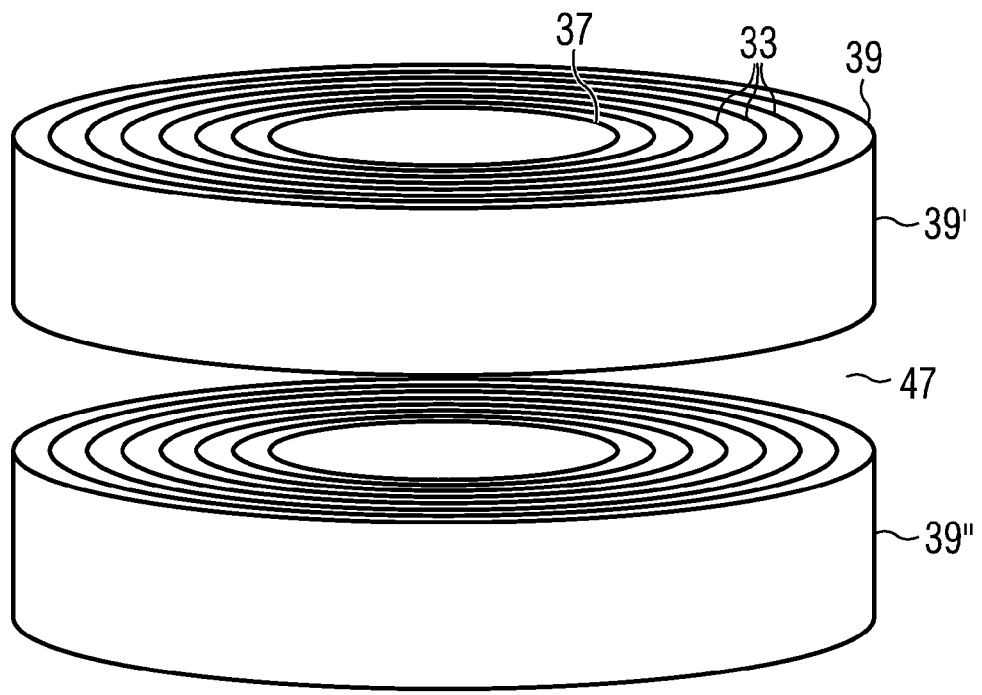
FIG. 4 shows a schematic illustration of the electrode structure having a stack of cylindrically arranged electrodes.

FIG. 4 illustrates an electrode shape in which hollow-cylindrical electrodes 33, 37, 39 are arranged concentrically to one another. The electrode stack is divided by a gap into two capacitor chains separated from one another, which can be interconnected using a switching device constructed similarly to FIG. 2. Acceleration or deceleration distances (not shown here), respectively, are formed through openings in the electrodes of the capacitor stack.

Figure 5:
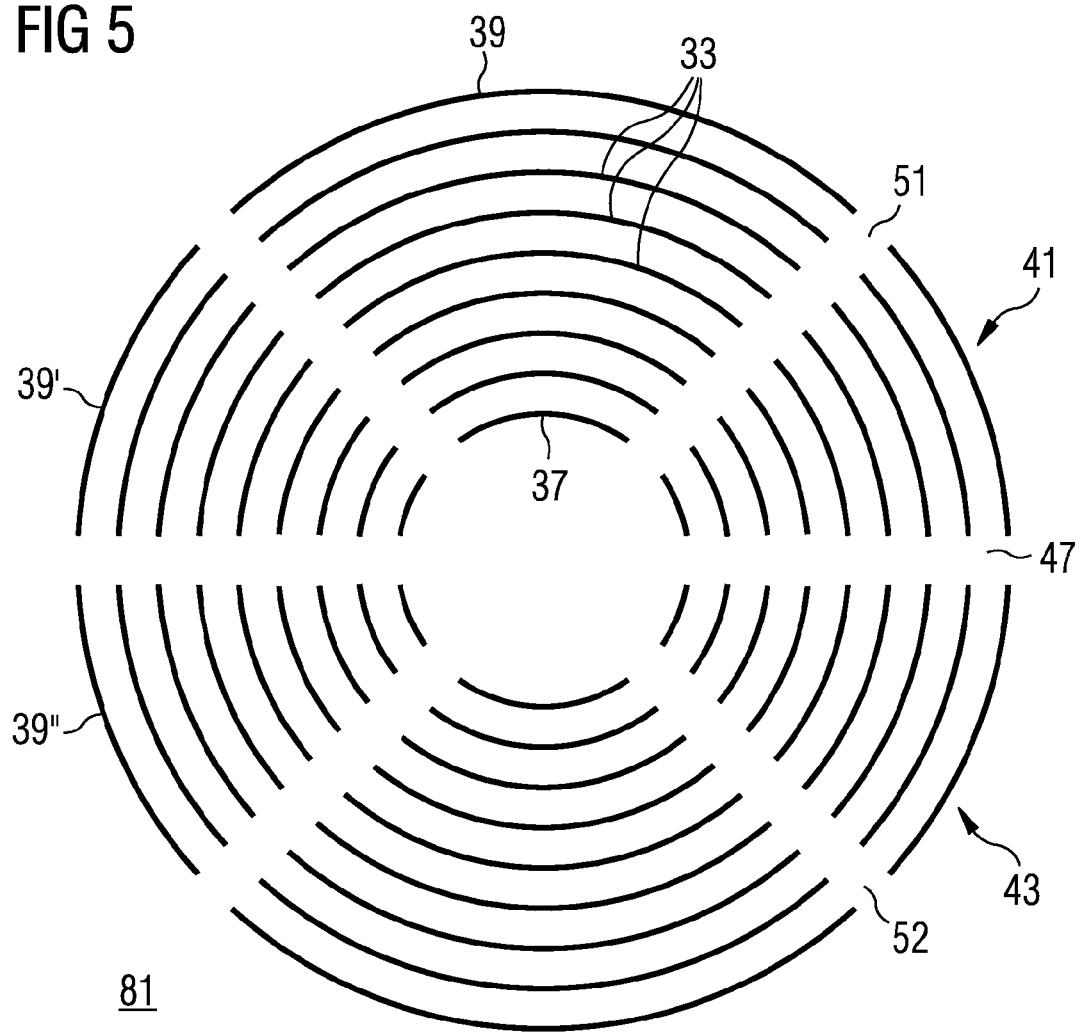
FIG. 5 shows a schematic illustration of a section through a potential field generation device according to FIG. 3 having electrode spacing decreasing toward the center.

FIG. 5 shows a refinement 81 of the high-voltage source shown in FIG. 2, in which the spacing of the electrodes 39, 37, 33 decreases toward the center. As explained below, through such an embodiment, the decrease of the pump AC voltage applied on the outer electrode 39 toward the center may be compensated for, so that nonetheless a substantially equal field strength prevails between adjacent electrode pairs. A substantially constant field strength may thus be achieved along the acceleration distances 51, 52.

Figure 6:
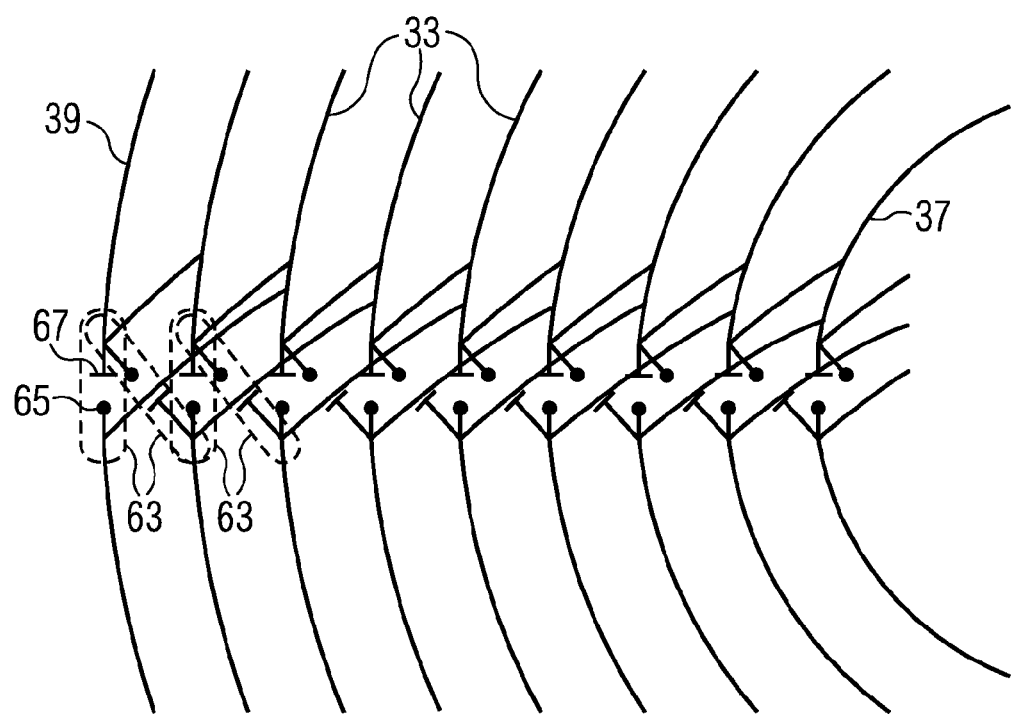
FIG. 6 shows an illustration of the diodes of the switching device, which are designed as electron tubes free of vacuum pistons.

FIG. 6 shows an embodiment of the diodes of the switching device. The concentrically arranged electrodes 39, 37, 33, which are like hemispherical shells, are only indicated schematically for the sake of clarity.

The diodes are shown here as electron tubes 63, having a cathode 65 and an opposing anode 67. Since the switching device is arranged in the vacuum insulation, the vacuum vessel of the electron tubes is dispensed with, which would otherwise be necessary for operating the electrons. The cathodes can be designed as thermal electron emitters, e.g., having radiant heating through the equatorial gap, or as photo-cathodes. The latter allow through modulation of the exposure, e.g., by laser radiation, a control of the current in each diode. The charging current and therefore indirectly the high voltage can thus be controlled.

More detailed explanations of components of the high-voltage source or the particle accelerator will be made hereafter.

Spherical Capacitor

The arrangement follows the principle shown in FIG. 1, of arranging the high-voltage electrode in the interior of the accelerator and the concentric ground electrode on the outer side of the accelerator.

A spherical capacitor having inner radius r and outer radius R has the capacitance $$C = 4\pi\epsilon_0 \frac{rR}{R-r}. \quad (3.1)$$

The field strength at radius p is then $$E = \frac{rR}{(R-r)\rho^2} U \quad (3.2)$$

This field strength is dependent on the square of the radius and therefore increases strongly toward the inner electrode. At the inner electrode surface ρ=R, the maximum $$\hat{E} = \frac{R}{r(R-r)} U \quad (3.3)$$

is achieved. This is disadvantageous from the aspect of the breakthrough strength.

A hypothetical spherical capacitor having a homogeneous electrical field would have the capacitance $$\overline{C} = 4\pi\epsilon_0 \frac{R^2 + rR + r^2}{R-r}. \quad (3.4)$$

Thus, because the electrodes of the capacitors of the Greinacher cascade are incorporated as intermediate electrodes at a clearly defined potential in the cascade accelerator, the field strength distribution is linearly equalized over the radius, since for thin-walled hollow spheres, the electrical field strength is approximately equal to the flat case $$E \to \frac{U}{(R-r)}. \quad (3.5)$$

with minimal maximal field strength.

The capacitance of two adjacent intermediate electrodes is $$C_k = 4\pi\epsilon_0 \frac{r_k r_{k+1}}{r_{k+1} - r_k}. \quad (3.6)$$

Hemispherical electrodes and equal electrode spacing d=(R−r)/N result in $r_k$=r+kd and electrode capacitances $$C_{2k} = C_{2k+1} \quad (3.7)$$
$$= 2\pi\epsilon_0 \frac{r^2 + rd + (2rd + d^2)k + d^2k^2}{d}.$$

Rectifiers

Modern avalanche semiconductor diodes (soft avalanche semiconductor diodes) have very low parasitic capacitances and have short recovery times. A circuit in series does not require any resistances for potential equilibration. The operating frequency can be selected as comparatively high, in order to use the relatively small interelectrode capacitances of the two Greinacher capacitor stacks.

In the case of a pump voltage for charging the Greinacher cascade, a voltage of $U_{in}$≈100 kV, i.e., 70 kV$_{eff}$, can be used.

The diodes must withstand voltages of 200 kV. This can be achieved in that chains of diodes having a lower tolerance are used. For example, ten 20 kV diodes can be used. Diodes can be, e.g., diodes from Philips having the designation BY724, diodes from EDAL having the designation BR757-200A, or diodes from Fuji having the designation ESJA5320A.

Rapid reverse recovery times, e.g., $t_{rr}$≈100 ns for BY724, minimize losses. The dimensions of the diode BY724 of 2.5 mm×12.5 mm allows all 1000 diodes for the switching device to be housed in a single equatorial plane for a spherical high-voltage source.

Instead of solid-state diodes, electron tubes can also be used, in which the electron emission is used for rectification. The chain of diodes can be formed by a plurality of electrodes of the electron tubes arranged to one another like a mesh, which are connected to the hemispherical shells. Each electrode acts on one side as a cathode, and on the other side as an anode.

Discrete Capacitor Stack

The central idea is to cut through the concentrically successively arranged electrodes on an equatorial plane. The two resulting electrode stacks represent the cascade capacitors. It is only necessary to connect the chain of diodes to opposing electrodes over the sectional plane. It is to be noted that the rectifier stabilizes the potential differences of the successively arranged electrodes automatically to approximately 2$U_{in}$, which approximates constant electrode intervals. The drive voltage is applied between the two outer hemispheres.

Ideal Capacitance Distribution

If the circuit only contains the capacitances of FIG. 3, the stationary operation of an operating frequency f delivers a charge $$Q = \frac{I_{out}}{f} \quad (3.8)$$

per full wave in the load by the capacitor $C_0$. Each of the capacitor pairs $C_{2k}$ and $C_{2k+1}$ therefore transmits a charge (k+1)Q.

The charge pump represents a generator source impedance $$R_G = \frac{1}{2f} \sum_{k=0}^{N-1} \left( \frac{2k^2 + 3k + 1}{C_{2k}} + \frac{2k^2 + 4k + 2}{C_{2k+1}} \right). \quad (3.9)$$

A load current $I_{out}$ thus reduces the DC output voltage according to $$U_{out} = 2NU_{in} - R_G I_{out}. \quad (3.10)$$

The load current causes an AC residual ripple at the DC output having the peak-to-peak value $$\delta U = \frac{I_{out}}{f} \sum_{k=0}^{N-1} \frac{k+1}{C_{2k}}. \quad (3.11)$$

If all capacitors are equal to $C_k=C$, the effective source impedance is $$R_G = \frac{8N^3 + 9N^2 + N}{12fC} \tag{3.12}$$

and the peak-to-peak value of the AC ripple is $$\delta U = \frac{I_{out}}{fC} \frac{N^2 + N}{2}. \tag{3.13}$$

For a given total energy storage within the rectifier, a capacitive imbalance in favor of the low-voltage part reduces the values $R_G$ and $R_R$ slightly in comparison to the typical selection of equal capacitors.

Figure 7:
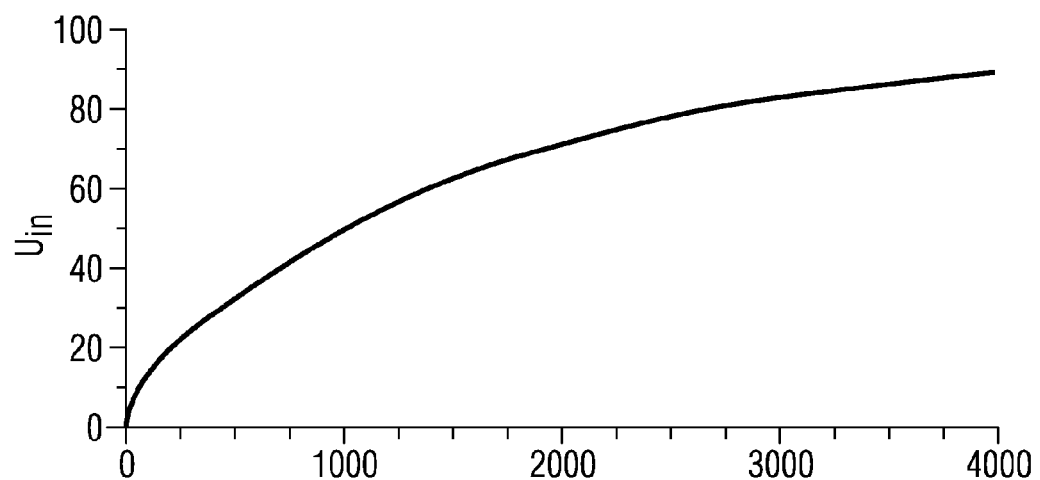
FIG. 7 shows a graph which shows the charging procedure as a function of pump cycles.

FIG. 7 shows the charging of an uncharged cascade of N=50 concentric hemispheres, plotted over the number of pump cycles.

Stray Capacitances

Any type of charge exchange between the two columns reduces the efficiency of the multiplier circuit, see FIG. 1, e.g., because of the stray capacitances $c_j$ and the reverse recovery charge losses $q_j$ by the diodes $D_j$.

The basic equations for the capacitor voltages $U_k^\pm$ at the positive and negative extremes of the peak drive voltage U, wherein the diode forward voltage drop is neglected, are:

$$U_{2k}^+ = u_{2k+1} \tag{3.14}$$

$$U_{2k}^- = u_{2k} \tag{3.15}$$

$$U_{2k+1}^+ = u_{2k+1} \tag{3.16}$$

$$U_{2k+1}^- = u_{2k+2} \tag{3.17}$$

up to the index 2N−2 and $$U_{2N-1}^+ = u_{2N-1} - U \tag{3.18}$$

$$U_{2N-1}^- = U. \tag{3.19}$$

With this nomenclature, the average amplitude of the DC output voltage is $$U_{out} = \frac{1}{2}\sum_{k=0}^{2N-1} u_k. \tag{3.20}$$

The peak-to-peak value of the ripple of the DC voltage is $$\delta U = \sum_{k=0}^{2N-1} (-1)^{k+1} u_k. \tag{3.21}$$

With stray capacitances $c_j$ parallel to the diodes $D_j$, the basic equations for the variables are $u_{-1}=0$, $U_{2N}=2U$, and the tridiagonal equation system is $$C_{k-1}u_{k-1} - (C_{k-1} + C_k)u_k + (C_k - c_k)u_{k+1} = \begin{cases} Q & \forall k \text{ even} \\ 0 & \forall k \text{ odd}. \end{cases} \tag{3.22}$$

Reverse Recovery Charges

Finite reverse recovery times $t_{rr}$ of the limited diodes cause a charge loss of $$q_D = \eta Q_D \tag{3.23}$$

with $\eta=ft_{rr}$ and $Q_D$ for the charge per full wave in the forward direction. Equation (3.22) then becomes $$C_{k-1}u_{k-1} - (C_{k-1} + (1-\eta)C_k)u_k + ((1-\eta)C_k - c_k)u_{k+1} = \begin{cases} Q & \forall k \text{ even} \\ 0 & \forall k \text{ odd}. \end{cases} \tag{3.24}$$

Continuous Capacitor Stack

Capacitive Transmission Line

In Greinacher cascades, the rectifier diodes essentially absorb the AC voltage, convert it into DC voltage, and accumulate it to form a high DC output voltage. The AC voltage is conducted by the two capacitor columns to the high-voltage electrode, and damped by the rectifier currents and stray capacitances between the two columns.

For a high number N of steps, this discrete structure can be approximated by a continuous transmission line structure.

For the AC voltage, the capacitor structure represents a longitudinal impedance having a length-specific impedance $\mathfrak{Z}$. Stray capacitances between the two columns introduce a length-specific shunt admittance $\mathfrak{Y}$. The voltage stacking of the rectifier diodes causes an additional specific current load $\mathfrak{J}$, which is proportional to the DC load current $I_{out}$ and the density of the taps along the transmission line.

The basic equations for the AC voltage U(x) between the columns and the AC longitudinal current I(x) are $$I' = \mathfrak{Y} U + \mathfrak{J} \tag{3.25}$$

$$U' = \mathfrak{Z} I. \tag{3.26}$$

The general equation is an expanded telegraph equation $$U'' - \frac{\mathfrak{Z}'}{\mathfrak{Z}} U' - \mathfrak{Z}\mathfrak{Y} U = \mathfrak{Z}\mathfrak{J}. \tag{3.27}$$

In general, the peak-to-peak ripple at the DC output is equal to the difference of the AC voltage amplitude at both ends of the transmission line $$\delta U = U(x_0) - U(x_1). \tag{3.28}$$

Two boundary conditions are required for an unambiguous solution of this second order differential equation.

One of the boundary conditions can be $U(x_0)=U_{in}$, given by the AC drive voltage between the DC low-voltage ends of the two columns. The other natural boundary condition defines the AC current at the DC high-voltage end $x=x_1$. The boundary condition for a concentrated terminal AC impedance $Z_1$ between the columns is $$U'(x_1) = \frac{\mathfrak{Z}(x_1)}{Z_1} U(x_1). \tag{3.29}$$

In the unloaded case $Z_1=\infty$, the boundary condition is $U'(x_1)=0$.

Constant Electrode Spacing

For a constant electrode spacing t, the specific load current is $$\mathfrak{J} = \frac{i\pi I_{out}}{t}. \tag{3.30}$$

so that the distribution of the AC voltage is regulated by $$U'' - \frac{\mathfrak{Z}'}{3}U' - 3\mathfrak{Z}U = 3\mathfrak{J}. \tag{3.31}$$

The average DC output voltage is then $$U_{out} = \frac{2U_{in}}{t}\int_0^{Nt} U(x)dx \tag{3.32}$$

and the peak-to-peak ripple of the DC voltage is $$\delta U = U(Nt) - U(0). \tag{3.33}$$

Optimum Electrode Spacing

The optimum electrode spacing ensures a constant electrical direct current field strength 2E at the planned DC load current. The specific AC load current along the transmission line is position-dependent $$\mathfrak{J} = \frac{i\pi E I_{out}}{U}. \tag{3.34}$$

The AC voltage follows $$UU'' - \frac{\mathfrak{Z}'}{3}UU' - 3\mathfrak{Z}U^2 = 3i\pi E I_{out}. \tag{3.35}$$

The electrode spacings result from the local AC voltage amplitudes $t(x) = U(x)/E$.

The DC output voltage at the planned DC load current is $U_{out} = 2Ed$. A reduction of the load always increases the voltage between the electrodes, an operation with low load or without load can thus exceed the permissible E and the maximum carrying capacity of the rectifier columns. It can therefore be advisable to optimize the design for an unloaded operation.

For each given electrode distribution which is different than that in the case of design for a planned DC load current, the AC voltage along the transmission line and therefore the DC output voltage is regulated by equation (3.27).

Linear Cascade

For a linear cascade having flat electrodes of the width w, height h, and a spacing s between the columns, transmission line impedances are $$\mathfrak{Z} = \frac{2}{i\epsilon_0 \omega w h}. \tag{3.36}$$

$$\mathfrak{Y} = \frac{i\epsilon_0 \omega}{s}\frac{w}{s}.$$

Linear Cascade—Constant Electrode Spacing

The inhomogeneous telegraph equation is $$U'' - \frac{2}{hs}U = \frac{I_{out}}{f\epsilon_0 w h t}. \tag{3.37}$$

Assuming a line which extends from x=0 to x=d=Nt and is operated by $U_{in}=U(0)$, and a propagation constant of $\gamma^2 = 2/(h*s)$, the solution is $$U(x) = \frac{\cosh\gamma x}{\cosh\gamma d}U_{in} + \left(\frac{\cosh\gamma x}{\cosh\gamma d} - 1\right)\frac{Ns}{2f\epsilon_0 d w}I_{out}. \tag{3.38}$$

The diodes essentially tap the AC voltage, rectify it, and accumulate it along the transmission line. The average DC output voltage is therefore $$U_{out} = \frac{2}{t}\int_0^d U(x)dx. \tag{3.39}$$

or—explicitly—

$$U_{out} = 2N\frac{\tanh\gamma d}{\gamma d}U_{in} + \left(\frac{\tanh\gamma d}{\gamma d} - 1\right)\frac{N^2 s}{f\epsilon_0 d w}I_{out}. \tag{3.40}$$

A series expansion to the third order according to $\gamma d$ results in $$U_{out} \approx 2NU_{in}\left(1 - \frac{2d^2}{3\ hs}\right) - \frac{2N^2}{3f}\frac{d}{\epsilon_0 h w}I_{out} \tag{3.41}$$

and $$\delta U \approx \frac{d^2}{hs}U_{in} + \frac{N}{f}\frac{d}{2\epsilon_0 h w}I_{out}. \tag{3.42}$$

The load-current-related effects correspond to equations (3.12) and (3.13).

Linear Cascade—Optimum Electrode Spacing

The basic equation here is $$UU'' - \frac{2}{hs}U^2 = \frac{EI_{out}}{f\epsilon_0 w h}. \tag{3.43}$$

It appears that this differential equation has no closed analytical solution. The implicit solution, which fulfills $U'(0)=0$, is $$x = \int_{U(0)}^{U(x)} \frac{du}{\sqrt{\frac{2}{hs}(u^2 - U^2(0)) + \frac{EI_{out}}{f\epsilon_0 w h}\log\frac{u}{U(0)}}}. \tag{3.44}$$

Radial Cascade

Under the assumption of a stack of concentric cylinder electrodes having a radius-independent height h and an axial gap s between the columns as shown in FIG. 4, the radial-specific impedances are $$\Im = \frac{1}{i\pi\epsilon_0 \omega r h}. \tag{3.45}$$

$$\mathfrak{B} = \frac{2i\pi\epsilon_0 \omega r}{s}.$$

Radial Cascade—Constant Electrode Spacing

With an equidistant radial electrode spacing $t=(R-r)/N$, the basic equation $$U'' + \frac{1}{\rho}U' - \frac{2}{hs}U = \frac{I_{out}}{\epsilon_0 \omega h t \rho} \tag{3.46}$$

has the general solution $$U(\rho) = AK_0(\gamma\rho) + BI_0(\gamma\rho) + \frac{I_{out}}{4\gamma f \epsilon_0 h t} L_0(\gamma\rho). \tag{3.47}$$

with $\gamma^2=2/(h*s)$. $K_0$ and $I_0$ are the modified Bessel functions and $L_0$ is the modified zero-order Struve function $L_0$.

The boundary conditions $U'(r)=0$ at the inner radius $r$ and $U(R)=U_{in}$ at the outer radius $R$ define the two constants $$A = \frac{U_{in} I_1(\gamma r) - \frac{I_{out}}{4\gamma f \epsilon_0 h t}\left[I_1(\gamma r)L_0(\gamma R) - I_0(\gamma R)\left(L_1(\gamma r) + \frac{2}{\pi}\right)\right]}{I_0(\gamma R)K_1(\gamma r) + I_1(\gamma r)K_0(\gamma R)} \tag{3.48}$$

$$B = \frac{U_{in} K_1(\gamma r) - \frac{I_{out}}{4\gamma f \epsilon_0 h t}\left[K_1(\gamma r)L_0(\gamma R) + K_0(\gamma R)\left(L_1(\gamma r) + \frac{2}{\pi}\right)\right]}{I_0(\gamma R)K_1(\gamma r) + I_1(\gamma r)K_0(\gamma R)} \tag{3.49}$$

so that $$U(\rho) = U_{in} \frac{I_0(\gamma\rho)K_1(\gamma r) + I_1(\gamma r)K_0(\gamma\rho)}{I_0(\gamma R)K_1(\gamma r) + I_1(\gamma r)K_0(\gamma R)} + \frac{I_{out}}{4\gamma f \epsilon_0 h t}\left[\begin{array}{l} L_0(\gamma\rho) - L_0(\gamma R)\frac{I_0(\gamma\rho)K_1(\gamma r) + I_1(\gamma r)K_0(\gamma\rho)}{I_0(\gamma R)K_1(\gamma r) + I_1(\gamma r)K_0(\gamma R)} - \\ \left(L_1(\gamma r) + \frac{2}{\pi}\right)\frac{I_0(\gamma\rho)K_0(\gamma R) - I_0(\gamma R)K_0(\gamma\rho)}{I_0(\gamma R)K_1(\gamma r) + I_1(\gamma r)K_0(\gamma R)} \end{array}\right]. \tag{3.50}$$

$K_1$ and $I_1$ are the modified Bessel functions and $L_1$ is the modified Struve function $L_1=L'_0-2/\pi$, all first-order.

The DC output voltage is $$U_{out} = \frac{2}{t}\int_r^R U(\rho)\,d\rho. \tag{3.51}$$

Radial Cascade—Optimum Electrode Spacing

The optimum local electrode spacing is $t(\rho)=U(\rho)/E$, and the basic equation becomes $$UU'' + \frac{1}{\rho}UU' - \frac{2}{hs}U^2 = \frac{EI_{out}}{\epsilon_0 \omega h \rho} \tag{3.52}$$

It appears that this differential equation has no closed analytical solution, but it can be numerically solved.

Electrode Shapes

Equipotential Surfaces

A compact machine requires a maximization of the electrical breakdown field strength. In general, smooth surfaces having low curvature are to be selected for the capacitor electrodes. The electrical breakdown field strength E is scaled in coarse approximation with the inverse square root of the electrode spacing, so that a large number of closely spaced apart equipotential surfaces having lower voltage differences are preferred over a few coarse spacings with large voltage differences.

Minimal Electrostatic Field Electrode Edges

Figure 8:
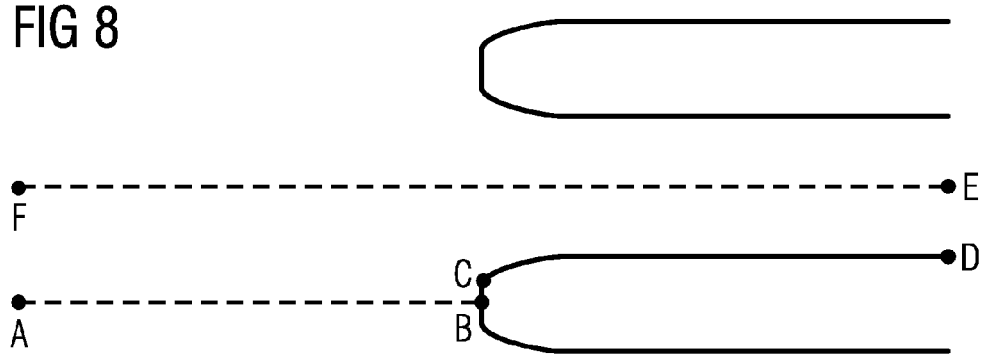
FIG. 8 shows the advantageous Kirchhoff shape of the electrode ends.

For an essentially level electrode structure having equidistant spacing and a linear voltage distribution, the optimum edge shape is known as the Kirchhoff shape (see below), $$x = \frac{A}{2\pi}\ln\frac{1+\cos\theta}{1-\cos\theta} - \frac{1+A^2}{4\pi}\ln\frac{1+2A\cos\theta+A^2}{1-2A\cos\theta+A^2} \tag{3.53}$$

$$y = \frac{b}{2} + \frac{1-A^2}{2\pi}\left(\arctan\frac{2A}{1-A^2} - \arctan\frac{2A\sin\theta}{1-A^2}\right). \tag{3.54}$$

as a function of the parameter $\theta \in [0,\pi/2]$. The electrode shape is shown in FIG. 8. The electrodes have a standardized uniform spacing and an asymptotic thickness $1-A$ far away from the edge, which tapers frontally to a vertical edge having the height $$b = 1 - A - \frac{2-2A^2}{\pi}\arctan A. \tag{3.55}$$

The parameter $0<A<1$ also represents the inverse electrostatic field superelevation because of the presence of the electrodes. The thickness of the electrodes can be arbitrarily small without introducing noticeable electrostatic field distortions.

A negative curvature, e.g., at the discharges along the beam path, further reduces the electrostatic field amplitude.

This positive result is to be attributed to the fact that the electrodes only induce a local disturbance of an already existing electrostatic field.

The optimum shape for freestanding high-voltage electrodes are Rogowski and Borda profiles, having a peak value in the electrostatic field amplitude of two times the undistorted field strength.

Drive Voltage Generator

The drive voltage generator must provide a high AC voltage at high frequency. The typical procedure is to amplify a moderate AC voltage through a highly insulated output transformer.

Interfering internal resonances, which are caused by unavoidable winding capacitances and stray inductances, make the drafting of a design for such a transformer a requirement.

An alternative can be a charge pump, i.e., a periodically operated semiconductor Marx generator. Such a circuit delivers an output voltage having an alternation between ground and a high voltage of a single polarity, and efficiently charges the first capacitor of the capacitor chain.

Breakdown Strength in Vacuum $d^{-0.5}$ law

There are a host of indications—but no final explanation—that for the electrode spacings greater than $d \approx 10^{-3}$ m, the breakdown voltage is approximately proportional to the square root of the spacing. The breakdown electrostatic field is therefore scaled according to $$E_{max} = \sigma d^{-0.5} \tag{A.1}$$

with constant A as a function of the electrode material (see below). It appears that for the fields of $E \approx 20$ MV/m, currently available electrode surface materials require an electrode spacing distance of $d \leq 10^{-2}$ m.

Surface Materials

The flashover between the electrodes in the vacuum is strongly dependent on the material surface. The results of the CLIC study (A. Descoeudres et al. "DC Breakdown experiments for CLIC", Proceedings of EPAC08, Genoa, Italy, page 577, 2008) show the breakdown coefficients

| material | $\sigma$ in $\left[\dfrac{MV}{\sqrt{m}}\right]$ | |
|---|---|---|
| steel | 3.85 | |
| SS 316LN | 3.79 | 3.16 |
| Ni | 3.04 | |
| V | | 2.84 |
| Ti | | 2.70 |
| Mo | | 1.92 |
| Monel | 1.00 | |
| Ta | | 1.34 |
| Al | 1.30 | 0.45 |
| Cu | 1.17 | 0.76 |

Dependence on the Electrode Surface

There are indications that the electrode surface has a substantial influence on the breakdown field strength. Thus:

$$E_{max} \approx 58 \cdot 10^6 \frac{V}{m} \left(\frac{A_{off}}{1\ cm^2}\right)^{-0.25} \tag{A.2}$$

for copper electrode surfaces and $2*10^{-2}$ mm electrode spacing. For planar electrodes made of stainless steel having $10^{-3}$ m spacing, the following equation applies:

$$E_{max} \approx 57.38 \cdot 10^6 \frac{V}{m} \left(\frac{A_{off}}{1\ cm^2}\right)^{-0.12} \tag{A.3}$$

Shape of the Electrostatic Field

Dielectric Degree of Utilization

It is generally recognized that homogeneous electrostatic fields permit the greatest voltages. The dielectric Schwaiger degree of utilization factor $\eta$ is defined as the inverse of the local electrostatic field superelevation because of field inhomogeneities, i.e., the ratio of the electrostatic field of an ideal flat electrode arrangement and the peak surface electrostatic field of the geometry in consideration of equal reference voltages and spacings.

It represents the utilization of the dielectric material in relation to electrostatic field amplitudes. For small spacings $d<6*10^{-3}$ m, inhomogeneous electrostatic fields appear to increase the breakdown voltage.

Curvature of the Electrode Surface

Since the electrostatic field inhomogeneity maxima occur at the electrode surfaces, the relevant dimension for the electrode shape is the mean curvature $H=(k1+k2)/2$.

There are various surfaces which fulfill the ideal of infinitesimal, locally moderate curvatures over large areas. For example, catenoid rotation surfaces with $H=0$ represent this.

Any purely geometric measure such as $\eta$ or H can only represent an approximation to the actual breakdown behavior. Local electrostatic field inhomogeneities have a nonlocal influence on the breakdown limit and can even improve the general overall field strength.

Constant Electrostatic Field Electrode Surfaces

FIG. 8 shows Kirchhoff electrode edges at A=0.6 for a vertical electrostatic field. The field elevation within the electrode stack is $1/A=1.\overline{6}$. The end faces are flat.

An electrode surface represents an equipotential line of the electrical field similarly to a free surface of a flowing liquid. A voltage-free electrode follows the flow field line. With the complex spatial coordinates z=x+iy, each analytical function w(z) fulfills the Poisson equation. The boundary condition for the free flow surface is equivalent at a constant dimension of the (conjugated) derivative v of a possible function w $$\bar{v} = \frac{dw}{dz}. \tag{A.4}$$

Any possible function $w(\bar{v})$ over a flow velocity $\bar{v}$ or a hodograph plane results in a z mapping of the plane $$z = \int \frac{dw}{\bar{v}} = \int \frac{1}{\bar{v}} \frac{dw}{d\bar{v}} d\bar{v}. \tag{A.5}$$

Without restriction of the generality, the dimension of the derivative on the electrode surface can be standardized to one, and the height DE can be designated as A in comparison to AF (see FIG. 6). In the $\bar{v}$ plane, the curve CD then maps on arc $i \to 1$ on the unit circle.

The points in FIGS. 8 A and F correspond to 1/A, B corresponds to the origin, C corresponds to i, D and E correspond to 1. The complete flow picture is mapped in the first quadrant of the unit circle. The source of the flow lines is 1/A, that of the drain is 1.

Two reflections on the imaginary axis and the unit circle expand this flow pattern over the entire complex $\bar{v}$ plane. The potential function $\omega$ is therefore defined by four sources at $\bar{v}$ positions +A, −A, 1/A, −1/A, and two drains of the strength 2 at ±1.

$$w = \log(\bar{v} - A) + \log(\bar{v} + A) + \log\left(\bar{v} - \frac{1}{A}\right) + \\ \log\left(\bar{v} + \frac{1}{A}\right) - 2\log(\bar{v} - 1) - 2\log(\bar{v} + 1). \tag{A.6}$$

Whose derivative is $$\frac{dw}{d\bar{v}} = \frac{1}{\bar{v} - A} + \frac{1}{\bar{v} + A} + \frac{1}{\bar{v} - \frac{1}{A}} + \frac{1}{\bar{v} + \frac{1}{A}} - \frac{2}{\bar{v} - 1} - \frac{2}{\bar{v} + 1} \tag{A.7}$$

and thus $$z - z_0 = \quad (A.8)$$

$$\int \frac{1}{\overline{v}} \left( \frac{1}{\overline{v}-A} + \frac{1}{\overline{v}+A} + \frac{1}{\overline{v}-\frac{1}{A}} + \frac{1}{\overline{v}+\frac{1}{A}} - \frac{2}{\overline{v}-1} - \frac{2}{\overline{v}+1} \right) d\overline{v}$$

At the free boundary CD, the flow velocity is $\overline{v}=e$ therefore $d\overline{v}=i\overline{v}d\phi$ and $$z - z_0 = \int_{-\frac{\pi}{2}}^{-0} \frac{i}{e^{v\varphi}-A} + \frac{i}{e^{v\varphi}+A} + \quad (A.9)$$

$$\frac{i}{e^{v\varphi}-\frac{1}{A}} + \frac{i}{e^{v\varphi}+\frac{1}{A}} - \frac{2i}{e^{v\varphi}-1} - \frac{2i}{e^{v\varphi}+1} d\varphi$$

with $z_0 = i$ b of point C. An analytical integration provides equation (3.54).

LIST OF REFERENCE NUMERALS 9 high-voltage cascade
11 input
13 diode
15 capacitor
17 capacitor
19 diode
21 output
23 first set of capacitors
25 second set of capacitors
29 accelerator
37 central electrode
39 outer electrode
71 first particle beam
73 second particle beam
75 interaction zone
77 first source
79 second source
83 first catcher electrode
85 second catcher electrode
31 high-voltage source
33 intermediate electrode
35 high-voltage cascade
39', 39" electrode shell half
41 first capacitor chain
43 second capacitor chain
45 AC voltage source
47 equatorial cut
49 diode
51 first acceleration channel
52 second acceleration channel
63 electron tubes
65 cathode
67 anode
81 high-voltage source

What is claimed is:

1. An accelerator for accelerating two beams of charged particles and for producing a collision between the two beams, the accelerator comprising:
a potential field device for generating an electrostatic potential field, which is configured such that the two beams of the charged particles are acceleratable or deceleratable by the electrostatic field,
a reaction zone in which the collision of the two beams occurs,
a first acceleration path for the first beam in the potential field, the first acceleration path being directed toward the reaction zone,
a first catcher for the decelerated particles of the first beam, the first catcher located at the end of the first beam path and being negatively charged,
a second acceleration path for the second beam in the potential field, the second acceleration path being directed toward the reaction zone, and
a second catcher for the decelerated particles of the second beam, the second catcher being located at the end of the second beam path and being negatively charged,
wherein the reaction zone is geometrically arranged in relation to the potential field and the first and second acceleration paths such that the particles of the two beams are acceleratable toward the reaction zone along the first acceleration path and the second acceleration path, and after interacting in the reaction zone and passing through the reaction zone are deceleratable again in the potential field, such that the energy applied by the potential field device to accelerate the two beams toward the reaction zone is at least partially reclaimable by the deceleration.

2. The accelerator of claim 1, comprising:
a first deceleration path for the first beam in the potential field, the first deceleration path being directed away from the reaction zone, and
a second deceleration path for the second beam in the potential field, the second deceleration path being directed away from the reaction zone.

3. The accelerator of claim 1, comprising:
a first source for providing charged particles for the first beam and for feeding them into the first acceleration path, and
a second source for providing charged particles for the second beam and for feeding them into the second acceleration path.

4. The accelerator of claim 1, wherein the first particles are protons, the second particles are boron ions, and the potential field is designed in particular such that a collision energy of greater than 600 keV is achievable.

5. The accelerator of claim 1, wherein the potential field device comprises a capacitor stack made of electrodes arranged concentrically to one another, including:
a first electrode which can be brought to a first potential,
a second electrode arranged concentrically to the first electrode and which can be brought to a second potential different from the first potential, such that an accelerating potential forms between the first electrode and the second electrode, and
wherein the reaction zone is located in an interior of the first electrode.

6. The accelerator of claim 5,
wherein the potential field device comprises one or more intermediate electrodes arranged concentrically between the first electrode and the second electrode, and
the accelerator further comprises a switching device to which the electrodes of the capacitor stack are connected, and which is configured such that during operation of the switching device, the electrodes of the capacitor stack, which are arranged concentrically to one another, can be brought to increasing potential steps according to the sequence of their arrangement.

7. An accelerator for accelerating two beams of charged particles and for producing a collision between the two beams, the accelerator comprising:
- a potential field device for generating an electrostatic potential field, which is configured such that the two beams of the charged particles are acceleratable or deceleratable by the electrostatic field, the potential field device comprising a capacitor stack made of electrodes arranged concentrically to one another, comprising:
  - a first electrode which can be brought to a first potential, and
  - a second electrode arranged concentrically to the first electrode and which can be brought to a second potential different from the first potential, such that an accelerating potential forms between the first electrode and the second electrode, and
- a reaction zone in which the collision of the two beams occurs, the reaction zone located in an interior of the first electrode,
- a first acceleration path for the first beam in the potential field, the first acceleration path being directed toward the reaction zone,
- a second acceleration path for the second beam in the potential field, the second acceleration path being directed toward the reaction zone,
- wherein the reaction zone is geometrically arranged in relation to the potential field and the first and second acceleration paths such that the particles of the two beams are acceleratable toward the reaction zone along the first acceleration path and the second acceleration path, and after interacting in the reaction zone and passing through the reaction zone are deceleratable again in the potential field, such that the energy applied by the potential field device to accelerate the two beams toward the reaction zone is at least partially reclaimable by the deceleration.

8. The accelerator of claim 7, comprising:
- a first deceleration path for the first beam in the potential field, the first deceleration path being directed away from the reaction zone, and
- a second deceleration path for the second beam in the potential field, the second deceleration path being directed away from the reaction zone.

9. The accelerator of claim 7, comprising:
- a first source for providing charged particles for the first beam and for feeding them into the first acceleration path and
- a second source for providing charged particles for the second beam and for feeding them into the second acceleration path.

10. The accelerator of claim 7, wherein the first particles are protons, the second particles are boron ions, and the potential field is designed in particular such that a collision energy of greater than 600 keV is achievable.

11. The accelerator of claim 7, wherein the potential field device comprises a capacitor stack made of electrodes arranged concentrically to one another, including:
- a first electrode which can be brought to a first potential,
- a second electrode arranged concentrically to the first electrode and which can be brought to a second potential different from the first potential, such that an accelerating potential forms between the first electrode and the second electrode, and
- wherein the reaction zone is located in an interior of the first electrode.

12. The accelerator of claim 7,
- wherein the potential field device comprises one or more intermediate electrodes arranged concentrically between the first electrode and the second electrode, and
- the accelerator further comprises a switching device to which the electrodes of the capacitor stack are connected, and which is configured such that during operation of the switching device, the electrodes of the capacitor stack, which are arranged concentrically to one another, can be brought to increasing potential steps according to the sequence of their arrangement.

* * * * *